US008517263B1

(12) United States Patent
Daniel

(10) Patent No.: US 8,517,263 B1
(45) Date of Patent: Aug. 27, 2013

(54) SYSTEM AND METHOD FOR VERIFYING AN INDIVIDUAL'S AUTHORIZATION TO CROSS BORDERS USING AN ELECTRONIC CARD WITH BIOMETRIC CONTROLS

(76) Inventor: Isaac S. Daniel, Miramar, FL (US)

( * ) Notice: Subject to any disclaimer, the term of this patent is extended or adjusted under 35 U.S.C. 154(b) by 21 days.

(21) Appl. No.: 13/041,974

(22) Filed: Mar. 7, 2011

Related U.S. Application Data

(63) Continuation-in-part of application No. 12/584,375, filed on Sep. 4, 2009, now Pat. No. 7,975,914, and a continuation-in-part of application No. 12/626,841, filed on Nov. 27, 2009, now Pat. No. 7,950,577.

(51) Int. Cl.
*G06K 5/00* (2006.01)
(52) U.S. Cl.
USPC ........ 235/380; 340/572.1; 340/10.1; 713/186
(58) Field of Classification Search
USPC .............. 235/380; 340/572.1, 10.1; 713/186
See application file for complete search history.

(56) References Cited

U.S. PATENT DOCUMENTS

| 6,776,332 | B2 | 8/2004 | Allen et al. | |
|---|---|---|---|---|
| 2002/0095587 | A1* | 7/2002 | Doyle et al. | 713/186 |
| 2004/0050930 | A1* | 3/2004 | Rowe | 235/380 |
| 2005/0212657 | A1* | 9/2005 | Simon | 340/5.74 |
| 2006/0107067 | A1* | 5/2006 | Safal et al. | 713/186 |
| 2008/0309490 | A1* | 12/2008 | Honkanen et al. | 340/572.1 |

FOREIGN PATENT DOCUMENTS

WO    WO 2004/059586    7/2004

* cited by examiner

*Primary Examiner* — Allyson Trail
(74) *Attorney, Agent, or Firm* — Carol N. Green, Esq.

(57) ABSTRACT

The present disclosure relates generally to a system and method, an electronic data card configured for electronically storing thereon at least one biometric identifier used to identify a card holder; biometric verification means, positioned on the electronic data card, configured for receiving at least one biometric sample from the card holder for validation with the at least one biometric identifier stored thereon; and a card reader in electronic communication with a computer processor and the electronic data card, wherein the card reader is configured for activating the electronic data card when the electronic data card is within a predetermined proximity to the card reader for validating the at least one biometric sample received contemporaneous to the activation of the electronic data card, and upon validation of the at least one biometric sample, the electronic data card releases the at least one card holder's identification information to the card reader, which receives the at least one card holder's identification information and transmits it to the computer processor for determining the at least one card holder's travel authorization.

23 Claims, 7 Drawing Sheets

SYSTEM AND METHOD FOR VERIFYING AN INDIVIDUAL'S AUTHORIZATION TO CROSS BORDERS USING AN ELECTRONIC CARD WITH BIOMETRIC CONTROLS

I. PRIORITY CLAIM

This patent application is a continuation in part of, and claims priority to U.S. Non-Provisional patent application Ser. No. 12/584,375 titled Apparatus, System And Method For Storing Passport Information filed Sep. 4, 2009; U.S. Provisional Patent Application Ser. No. 61/277,989 titled Method Of Processing An Immigration Customs Visa Card filed on Sep. 29, 2009; and U.S. Non-Provisional patent application Ser. No. 12/626,841, titled Apparatus, System And Method For Verifying Authorized Entry Using An Immigration Customs Visa Card filed Nov. 27, 2009. The entire disclosures of the afore-mentioned applications are incorporated by reference as if fully stated herein.

II. FIELD OF THE INVENTION

The present disclosure relates generally to a system and method, for verifying an individual's authorization to enter into a country's borders using an electronic data card configured for electronically storing thereon at least one biometric identifier used to identify a card holder; biometric verification means, positioned on the electronic data card, configured for receiving at least one biometric sample from the card holder for validation with the at least one biometric identifier stored thereon; and a card reader configured for activating the electronic data card, where upon validation of the biometric sample, the electronic data card releases the card holder's information to the card reader, which receives and transmits the information to a computer processor for determining the card holder's travel authorization.

III. BACKGROUND OF THE INVENTION

In the wake of the terrorist attacks of Sep. 11, 2001 many developed countries have implemented new security measures with more stringent rules in an effort to minimize and/or eliminate the threat of terrorism within their country's borders. One such recent measure in the United States of America is the enactment of the REAL ID Act, from which the enhanced driver's license program was developed as a means of reducing fraud, and improving the reliability and accuracy of identification documents that state government's issue. However, the enhanced driver's license is still vulnerable to being tampered with and being counterfeit-resistant. Thus, there needs to be a secure means of authenticating the identity of the card holder that overcomes these limitations.

Accordingly, the various embodiments and disclosures described herein satisfies these long felt needs and solves the limitations of the prior art in a new and novel manner.

IV. SUMMARY OF THE INVENTION

The system and method disclosed herein comprises of an electronic data card configured for electronically storing thereon at least one biometric identifier used to identify a card holder; biometric verification means, positioned on the electronic data card, configured for receiving at least one biometric sample from the card holder for validation with the at least one biometric identifier stored thereon; and a card reader in electronic communication with a computer processor and the electronic data card, wherein the card reader is configured for activating the electronic data card when the electronic data card is within a predetermined proximity to the card reader, for validating the at least one biometric sample received contemporaneous to the activation of the electronic data card, where upon validation of the at least one biometric sample, the electronic data card releases the at least one card holder's information to the card reader, which receives the at least one card holder's information and transmits it to the computer processor for determining the at least one card holder's travel authorization.

System and method further comprises of an application program executable on a computer; and computer executable instructions executable by at least one computer processor and configured to perform any one or more of the following: control the card reader to activate the electronic data card; control the card reader to receive the at least one card holder's information upon validation of the biometric sample; and control the card reader to transmit the at least one card holder's information to the computer processor for verification of the at least one card holder's travel authorization.

The electronic data card is selected from the group of electronic devices comprising essentially of smart cards, memory cards and processor cards. The electronic data card includes memory means, wherein memory means may include any one or more of the following stored thereon: at least one biometric sample, at least one biometric identifier, identification information, travel authorization, background report, visa restrictions, or other data structures. Data structures include but are not limited to: card number, security parameters, visa restrictions, and identification information. Identification information includes but is not limited to: name, address, date of birth, sex, issue date, and height and other like identification information.

Biometric verification means as used herein includes but is not limited to: fingerprint recognition means, hand geometry recognition means, palm geometry recognition means, iris recognition means, retina recognition means, and speech recognition means.

The electronic data card is configured for communicating with the computer or the card reader in any of the following manner: wirelessly or wired and for being accessed by the application program executable on the computer. The predetermined proximity is programmable for a range comprising of 1 to 1.5 inches from the card reader.

In some embodiments, method comprises of providing an electronic data card configured for electronically storing thereon at least one biometric identifier used to identify a card holder; providing biometric verification means, positioned on the electronic data card, configured for receiving at least one biometric sample from the card holder for validation with the at least one biometric identifier stored thereon; and providing a card reader in electronic communication with a computer processor and the electronic data card, wherein the card reader is configured for activating the electronic data card when the electronic data card is within a predetermined proximity to the card reader, for validating the at least one biometric sample received contemporaneous to the activation of the electronic data card, where upon validation of the at least one biometric sample, the electronic data card releases the at least one card holder's information to the card reader, which receives the at least one card holder's information and transmits it to the computer processor for determining the at least one card holder's travel authorization.

Method may also comprise of providing an application program executable on a computer; and providing computer executable instructions executable by at least one computer processor configured to perform any one or more of the following: control the card reader to activate the electronic data card; control the card reader to validate the biometric sample with the at least one biometric identifier stored thereon; or control the card reader to receive the card holder's identification information stored thereon upon validation of the biometric sample.

In some embodiments, method comprises of activating an electronic data card, where upon activation the electronic data card validates at least one biometric sample, recently received from card holder via biometric verification means positioned on the electronic data card, with at least one biometric identifier stored on the electronic data card and releases card holder's information to a card reader; and receiving the card holder's information stored on the electronic data card upon validation of the biometric sample. Method may also further comprise of accessing law enforcement records for determining the card holder's authorization to enter a country's borders.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the system and method may be derived by referring to the detailed description and claims when considered in connection with the Figures, wherein like reference numbers refer to similar items throughout the Figures.

DETAILED DESCRIPTION OF THE PREFERRED EMBODIMENT

System Level Overview

Figure 1A:
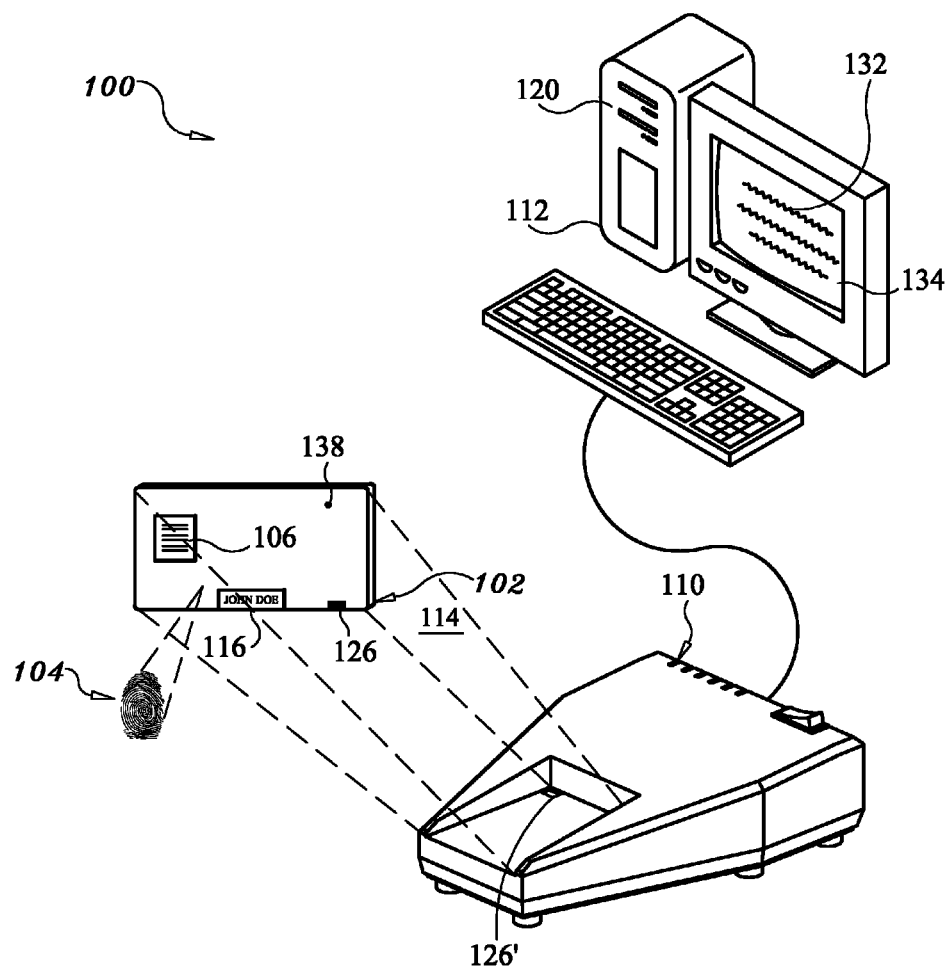
FIG. 1A is an exemplary embodiment of the system.

The following discussion describes in detail, varied embodiments of the system 100 and methods disclosed herein. However, this discussion should not be construed, as limiting the invention to those particular embodiments, as practitioners skilled in the art will appreciate that the system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the various views.

FIG. 1A is an illustrative diagram of an exemplary embodiment of the system 100. System 100 comprises of an electronic data card 102, configured for electronically storing thereon at least one or more biometric identifiers 104, 104' used to identify a card holder; biometric verification means 106, positioned on the electronic data card 102, configured for receiving at least one biometric sample 108 (as shown in FIG. 1C) from the card holder for validation with the at least one or more biometric identifiers 104, 104' stored thereon; and a card reader 110 in electronic communication with a computer processor 112 and the electronic data card 102, wherein the card reader 110 is configured for activating the electronic data card 102 when the electronic data card 102 is within a predetermined proximity 114 to the card reader 110, for validating the at least one biometric sample 108 with the at least one biometric identifier 104 stored thereon, that was received contemporaneous to the activation of the electronic data card 102, where upon validation of the at least one biometric sample 108, the electronic data card 102 releases the at least one card holder's information stored thereon, e.g. identification information 116, to the card reader 110, which receives the card holder's information and transmits it to the computer processor 112 for determining the card holder's travel authorization 118, e.g. to enter a country's borders.

Figure 1B:
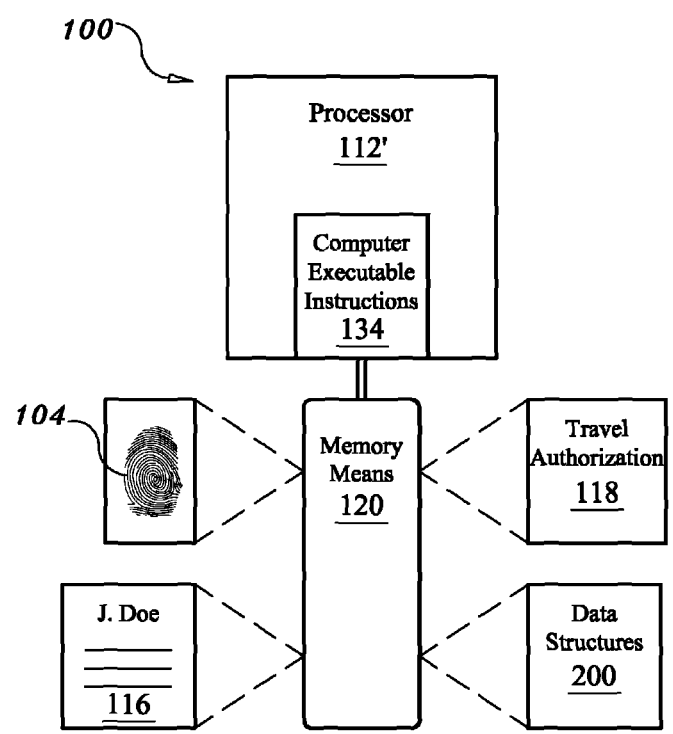
FIG. 1B is an exemplary embodiment of the electronic data card according to one embodiment.
Figure 1C:
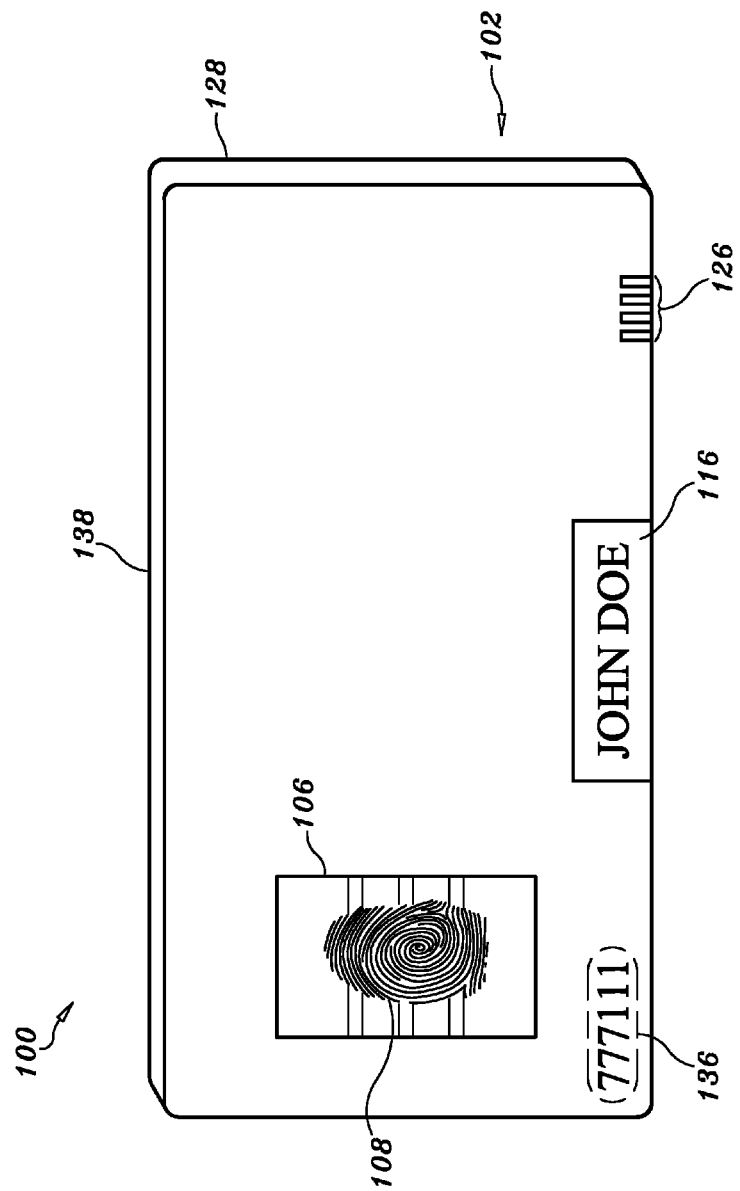
FIG. 1C is an exemplary embodiment of the electronic data card according to one embodiment.

Electronic data card 102 is selected from the group of electronic devices consisting essentially of programmable smart cards, memory cards, and processor cards, which includes at least one memory means 120 embedded therein as exemplified in FIG. 1B. Prior to the electronic data card 102 being first used by the card holder as a means of verifying the card holder's travel authorization 118, card holder will need to initially submit at least one or more biometric samples 108, 108' (as shown in FIG. 1C) that are electronically stored and enrolled thereon as biometric identifiers 104, 104'. Biometric identifiers 104, 104' are used to uniquely identify the individual based on his/her intrinsic physical traits, e.g. fingerprints, retina scan, palm geometry, hand geometry, speech, and or other biometric identifiers 104, 104' that are used in the arts.

Electronic data card 102 also includes biometric verification means 106 positioned thereon, wherein the biometric verification means 106 is configured for receiving a current cardholder's biometric sample 108 in person, for comparison with the at least one or more biometric identifiers 104, 104' previously stored thereon. Biometric verification means 106 include but are not limited to: fingerprint recognition means, hand geometry recognition means, palm geometry recognition means, iris recognition means, retina recognition means, speech recognition means and any other biometric verification means 106 that are known and used in the arts.

In some embodiments, biometric verification means 106 may be disposed in communication with the electronic data card's computer processor 112' and, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry and such other biometric verification means 106 that are known and used in the arts. Illustratively, as seen in FIG. 1A, the biometric verification means 106 includes a fingerprint scanner, where the electronic data card's computer processor 112' controls the functionality of the fingerprint scanner, generating the varied algorithms for storage of the initial valid biometric samples 108, 108' stored thereon as biometric identifiers 104, 104' and validates images of subsequent biometric samples 102, 102' received from the electronic data card holder contemporaneous to the card reader 110 establishing connectivity to the electronic data card 102.

FIG. 1B is an exemplary embodiment of the electronic data card 102 according to one embodiment. As shown in FIG. 1B, the electronic data card's computer processor 112' is electronically connected to the memory means 120. Computer processor 112' may be any type of computer processor 112, such as, but not limited to, a central processing unit (CPU), a microprocessor, a video processor, a front end processor, a coprocessor, a single-core processor, a multi-core processor, as well as any known computer processor 112 that's used in the arts.

Figure 2:
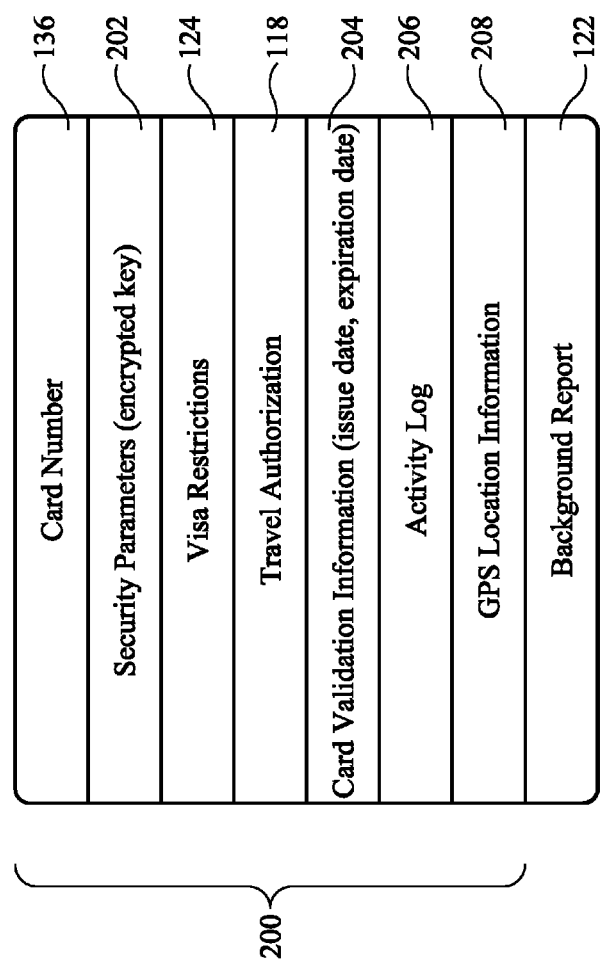
FIG. 2 illustrates, by way of example, collectively the data structures stored within an embodiment of the electronic data card.

The at least one memory means 120 is configured for storing temporarily or permanently any one or more of the following thereon: at least one biometric sample 108, at least one or more biometric identifiers 104, 104', identification information 116, travel authorization 118, background report 122, visa restrictions 124, and/or other data structures 200 (as shown in FIG. 2). Memory means 120 may include a hardware component, e.g. storage hardware, in electrical communication with at least one computer processor 112'. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 120 may comprise of both hardware and software components. In some embodiments, at least one memory means 120 may be embedded within at least one computer processor 112' where the information stored thereon is encrypted for privacy purposes. In other embodiments, the at least one memory means 120 is adapted with electrical contacts 126, for establishing wired and/or wireless connectivity with external devices, e.g. a computer processor 112, via for example a microchip and/or at least one microcomputer processor 112 where the memory means 120 is embedded within.

In some embodiments, electronic data card 102 may optionally include a battery 128 (not shown), which serves as a power source for the at least one microprocessor 112' positioned therein. In some embodiments, electronic data card 102 is adapted with electrical contacts 126 for establishing wired connectivity to the card reader 110, and as such may not include a battery 128 (not shown). In that event, computer processor 112' detects the established connection between the electronic data card 102 and card reader 110 and derives power from the card reader 110 to activate the electronic data card 102 so that the biometric sample 108 can be validated by comparing it with the biometric identifiers 104, 104' stored thereon. While in some embodiments, the electronic data card 102 may include a computer microprocessor 112' (as previously described) that is positioned within, in other embodiments it does not.

Referring back to FIG. 1A, card reader 110 describes a device for scanning, reading and/or writing to the electronic data card 102 and the information stored thereon, e.g. at least one biometric sample 108, at least one or more biometric identifiers 104, 104', identification information 116, travel authorization 118, background report 122, visa restrictions 124, and/or other data structures and the like, and in some embodiments for verifying card holder's eligibility to cross into another country's borders. Card reader 110 as exemplified herein may be adapted with electrical contacts 126' for establishing wired connectivity to a plurality of electronic data cards 102, 102', and/or a computer processor 112.

Alternatively, a wireless connection may be established with either the computer processor 112 and/or the electronic data card 102, wherein communication access is established in response to a predetermined proximity 114 or manual activation of the card reader 110. Card reader 110 may also be integrated within a computer processor 112 (e.g. with a slot for wired card connectivity), an external device (e.g., USB connection to a small housing), or be integrated into other devices, e.g. a kiosk 130 (not shown) that are known and used in the arts.

In some embodiments, the card reader 110 and/or the card 102 may be programmed for activation solely when the card 102 is within a programmable predetermined proximity 114. In some embodiments, the predetermined proximity 114 is programmed to be any distance between 1 to 1.5 inches, where accessing the electronic card 102 at such close proximity helps minimize unauthorized skimming of the electronic data stored thereon. In other embodiments, predetermined proximity 114 may be programmed to be more or less than 1" and/or 1.5". As such, when the card 102 is within the programmed predetermined proximity 114, the electronic data card 102 is activated as soon as the card holder provides a valid biometric sample 108 that matches the biometric identifier 104 electronically stored thereon, causing the release of the information stored thereon to the card reader 110 which transmits the information to the computer processor 112 for verifying the card holder's travel authorization 118. If the electronic data card 102 is within the predetermined proximity 114 and the biometric sample 108 fails to match the biometric identifier 104 stored thereon, the electronic data card 102 will not be activated and there is no transfer of the electronic data stored thereon. This feature provides added security such that if the electronic data card 102 is found an in some embodiments may not include any indicia of the owner's visual identity and the finder tries to use the found electronic data card 102, the biometric sample 108 will not match the biometric identifier 104 stored thereon and the identity and authorization information stored on the card 102 remains intact and will not be transferred.

In some embodiments, card reader 110 is in electronic communication with a computer processor 112, e.g. a network enabled computer processor 112 such as a laptop or personal digital assistant subject to wired/wireless connectivity is configured with an application program 132 stored thereon to facilitate communications between the electronic data card 102 and the computer processor 112 via the card reader 110. Application program 132 may comprise in part of a browser, such as for use on a personal computer processor 112 or similar browsing device. The electronic data card 102 may also be configured for being accessed by the application program 132 that is executable on the computer processor 112.

System 100 may also comprise of computer executable instructions 134, 134' executable by the computer's at least one computer processor 112 (and/or the electronic card's processor 112'), and operative to perform the system 100 functions and methods disclosed herein. Computer's at least one computer processor 112 may be any type of processor, such as a central processing unit (CPU), a microprocessor, a front end processor, a coprocessor, a single-core processor, a multi-core processor, as well as any known computer processor 112 that's used in the arts.

Computer executable instructions 134, 134' may be loaded directly on the computer processor 112, 112' or may be stored in computer's' memory means 120', such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 134, 134' may be any type of computer executable instructions 134, 134', which may be in the form of a computer program, the program being composed in any suitable programming language or source code, such as C++, C, JAVA, JavaScript, HTML, XML, and other programming languages. Computer executable instructions 134, 134' executable by the at least one computer processor 112' is configured to perform any one or more of the following: control the card reader 110 to activate the electronic data card 102 for validating the biometric sample 108 received contemporaneous to the card 102 activation; control the card reader 110 to receive the at least one card holder's information 116 stored thereon upon validation of the biometric sample 108 and/or control the card reader 110 to transmit the at least one card holder's information to the computer processor 112 for verification of the at least one card holder's travel authorization 118.

FIG. 1C is an exemplary embodiment of the electronic data card 102. In some embodiments, electronic data card 102 may include an electronic data card number 136 stamped or engraved on the card's exterior 138, which uniquely identifies the card holder to the issuing state or country as a validly authorized card holder. Electronic data card number 136 is generally assigned by an issuing state and may be assigned via a random number generating program, comprising of numerals, characters, alphanumeric characters or any other unique identifiers that are known and used in the arts. In some embodiments, the card number 136 is similar to the numbering algorithm used for state issued driver's license numbers, which on occasion incorporate state identification information and social security information incorporated therein. Prior to being issued to the card holder, the electronic data card number 136 may be recorded by the issuing state as another means of identifying the card holder. In some Electronic data card 102 may also include other indicia of identification, e.g. card holder's identification information 116. As used herein, identification information 116 may include but is not limited to any one or more of the following: name, address, date of birth, sex, issue date, height, and the like. In some embodiments, the card holder's name and other identification information 116 may or may not be printed on the electronic data card's exterior 138 and/or stored within the electronic data card's memory means 120. In other embodiments, the card holder's information 116 is absent from the card's exterior 138.

Card holder's identity may also be verified to the appropriate authorities using the biometric verification means 106 stored thereon. For example, in instances where the biometric verification means 106 includes a fingerprint scanner, the electronic data card holder may be required to submit an in person biometric sample 108 using the same finger previously used to obtain at least one valid biometric sample 108 stored thereon as the biometric identifier 104. If the card holder submits a biometric sample 108 that fails to match the biometric identifier 104, the authorities can take the appropriate action to verify that the card holder is authorized to be in possession of the electronic data card 102 and/or authorized to cross the border.

FIG. 2 illustrates, by way of example, collectively the data structures 200 stored within an embodiment of the electronic data card 102. Data structures 200 are retained within the electronic data card's memory means 120, which preferably provides sufficient processing resources to facilitate communication and maintain adequate security for the card. Data structures 200 may include but is not limited to: card number 136, security parameters 202, travel authorization 118, visa restrictions 124, card validation information 204, activity log 206 and Global Positioning System ("GPS") location information 210.

Data structures 200 include but are not limited to: card number 136, security parameters 202, visa restrictions 124, travel authorization 118, card validation information 204, activity log 206, and Global Positioning System ("GPS") location information 208.

Card number 136 may act as a unique identifier allowing the system 100 to uniquely recognize and register each electronic data card 102 that has been assigned and issued to individual card holders. Security parameters 202 may be provided, that may include an encrypted key(s) of military grade, and or security codes, biometric security features, and/or other security mechanisms.

Visa restrictions 124 for the card recipient may be stored thereon which may include but is not limited to pre-approved status, photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), and type of visa and the like. It will be understood that access to the visa restrictions 124 field may be provided in a hierarchical form associated with security provisions to protect the information stored on the electronic data card 102.

Travel authorization 118 may include but is not limited to a list of countries that card holder is authorized to enter; any limitations placed on card holder's ability to travel across various borders and the like.

Card validation information 204 may include for example the issue date that corresponds to the date the electronic data card 102 was issued to the card holder, and/or card expiration date 210 (not shown), i.e. the last valid date for use of the electronic data card 102 as set by the issuing authority. Activity log 206 may optionally contain a record of all uses of the electronic data card 102, e.g. embassies for which the electronic data card 102 was presented as a means of identifying the card holder's pre-authorized status for immigrating into a country's borders.

In some embodiments, the electronic data card 102 may include GPS location determining means 212 (not shown), e.g. a GPS transponder, for determining the location of the electronic data card 102 with means for encoding 214 (not shown) the location into an electronic signal 216 (not shown) using e.g. a computer processor 112, e.g. a microprocessor, which is transmitted to an authorized institution 218 (not shown) where the transmitted electronic signal 216 (not shown) is decoded and the location of the electronic data card 102 or use activity may be monitored in real-time. Therefore, the location of the electronic data card 102 and as such the location of the electronic data card holder may be determined in real-time via a global satellite system, where the information, i.e. the longitude and latitude coordinates, may be stored in the GPS location information 210.

In some embodiments, background report 122 may be stored in electronic data card's memory means 120, which may include a report based on a verification of the information provided by the card holder prior to obtaining an electronic data card 102. Background report 122 may include but is not limited to information concerning a criminal background check, verification of local address, bank account information, verification of education and the like. Included in the background report 122 may be a flag indicating the pre-approved status of the card holder showing whether card holder qualifies for entering a country's borders and if not, then why.

Methods

Figure 3:
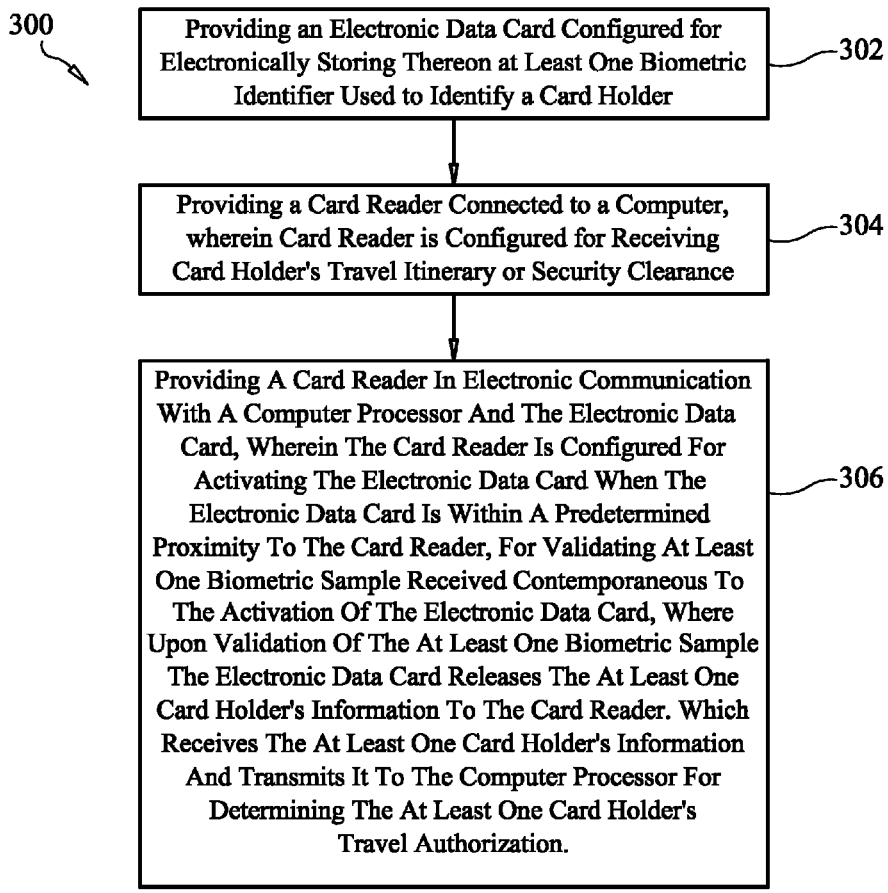
FIG. 3 is a sample flowchart of a block diagram of an exemplary method of processing an electronic data card in accordance with one embodiment.

FIG. 3 is a sample flowchart of an exemplary method 300 of verifying an individual's authorization to cross borders using an electronic data card 102 with biometric verification means 106 according to one embodiment. Method 300 comprises of providing an electronic data card 102 configured for electronically storing thereon at least one biometric identifier 104 used to identify a card holder (step 302) for determining the card holder's authorization to enter a country's borders.

As previously discussed, electronic data card 102 is selected from the group of electronic devices consisting essentially of programmable smart cards, memory cards, and processor cards, with at least one memory means 120 embedded therein. Identification information 116 as used herein includes any one or more of the following: name, address, date of birth, sex, issue date, height, and the like.

Such memory means 120 may include a hardware component, e.g. storage hardware, in electrical communication with at least one computer processor 112. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 120 may comprise of both hardware and software components. Memory means 120 is configured for storing temporarily or permanently any one or more of the following thereon: at least one biometric sample 108, at least one or more biometric identifiers 104, 104', identification information 116, travel authorization 118, background report 122, visa restrictions 124, and/or other data structures 200. Data structures 200 include but are not limited to: card number 136, security parameters 202, visa restrictions 124, travel authorization 118, card validation information 204, activity log 206, and Global Positioning System ("GPS") location information 210 and/or background report 122.

In some embodiments, at least one memory means 120 may be embedded within at least one computer processor 112 where the information stored therein is encrypted for privacy purposes. In other embodiments, the at least one memory means 120 is adapted with electrical contacts 126 for establishing wired and/or wireless connectivity with external devices, e.g. a computer and the memory means 120, via for example a microchip and/or at least one microcomputer processor 112 where the memory means 120 is embedded within.

Method 300 also comprises of providing biometric verification means 106, positioned on the electronic data card 102, configured for receiving at least one recently provided biometric sample 108 from the card holder for validation with the at least one biometric identifier 104 stored thereon (step 304), where the biometric sample 108 was received contemporaneous to the electronic data card 102 being activated by the card reader when the card 102 approached a predetermined proximity 114 to the card reader 110. Biometric verification means 106 includes but is not limited to: fingerprint recognition means, hand geometry recognition means, palm geometry recognition means, iris recognition means, retina recognition means, speech recognition means and any other biometric verification means 106 that are known and used in the arts. Biometric verification means 106 may include at least one computer processor 112' positioned within the electronic data card 102 and disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry and such other biometric verification means 106 that are known and used in the arts.

Method 300 further comprises of providing a card reader 110 connected to a computer processor 112 in electronic communication with the electronic data card 102, wherein the card reader 110 is configured for activating the electronic data card 102 when the electronic data card 102 is within a programmable predetermined proximity 114 to the card reader 110, for validating the at least one biometric sample 108 received contemporaneous to the activation of the electronic data card 102, wherein upon validation of the biometric sample 108, the electronic data card 102 releases the at least one card holder's information stored thereon, e.g. identification information 116, to the card reader 110, which receives the card holder's information and transmits it to the computer processor 112 for determining the at least one card holder's travel authorization 118 (step 306).

Card reader 110 describes a device for scanning and reading the electronic data card 102 and the information stored thereon, e.g. biometric identifier 104, visa restrictions 124, travel authorization 118, visa restrictions 124, background report 122 and/or any other information that is a part of the data structures 200 stored thereon. Card reader 110 is connected to a computer processor 112 either wirelessly or wired, and is configured for receiving the information stored on the electronic data card 102 and in some embodiments for verifying the card holder's approval status for entering into a country's borders. Card reader 110 describes a device for scanning, reading and/or writing to the electronic data card 102 and the information stored thereon, e.g. at least one biometric sample 108, at least one or more biometric identifiers 104, 104', identification information 116, travel authorization 118, background report 122, visa restrictions 124, and/or other data structures and the like, and in some embodiments for verifying card holder's eligibility to cross into another country's borders.

Card reader 110 may be adapted with electrical contacts 126' for establishing wired and/or wireless connectivity to electronic data cards 100, 100', 100" and/or the computer processor 112. Alternatively, a wireless connection may be established, wherein communication access is established in response to a programmable predetermined proximity 114 for the electronic data card 102 to be activated. In some embodiments, the card reader 110 is required to be no more than 1.5 inches away from the electronic card 102 in order for it to be activated by the card reader 110, which helps to minimize unauthorized capturing of the information stored thereon. In other embodiments, the programmable predetermined proximity 114 may be less than or more than 1.5". In either event, card reader 110 may be programmed to function at the desired predetermined proximity 114. Card reader 110 may also be integrated within a computer processor 112 (e.g. with a slot for wired card connectivity), an external device (e.g., USB connection to a small housing), or be integrated into other devices, e.g. a kiosk 130 (not shown) that are known and used in the arts.

Computer processor 112, e.g. a network enabled computer processor 112, i.e. a laptop or personal digital assistant subject to wired/wireless connectivity is configured with an application program 132 stored thereon to facilitate communications between the electronic data card 102 and the computer processor 112 through the card reader 110. Application program 132 may comprise in part of a browser, such as for use on a personal computer processor 112 or similar browsing device as previously described in conjunction with FIGS. 1-2.

Computer processor 112, 112' may also comprise of computer executable instructions 134, 134' executable by the computer's at least one computer processor 112, 112' and operative to perform the system 100 and methods disclosed herein. Computer executable instructions 134, 134' may be loaded directly on the computer's computer processor 112, 112', or may be stored in memory means 120,120' such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 134, 134' may be any type of computer executable instructions 134, 134', which may be in the form of a computer program, the program being composed in any suitable programming language or source code, such as C++, C, JAVA, JavaScript, HTML, XML, and other programming languages. Computer executable instructions 134, 134' executable by the at least one computer processor 112' is configured to perform any one or more of the following: control the card reader 110 to activate the electronic data card 102 for validating the biometric sample 108 received contemporaneous to the card 102 activation; control the card reader 110 to receive the at least one card holder's information 116 stored thereon upon validation of the biometric sample 108 and/or control the card reader 110 to transmit the at least one card holder's information to the computer processor 112 for verification of the at least one card holder's travel authorization 118.

Processors 112, 112' may be any type of processor, such as a central processing unit (CPU), a microprocessor, a front end processor, a coprocessor, a single-core processor, a multi-core processor, as well as any known computer processor 112, 112' that are used in the arts.

Figure 4:
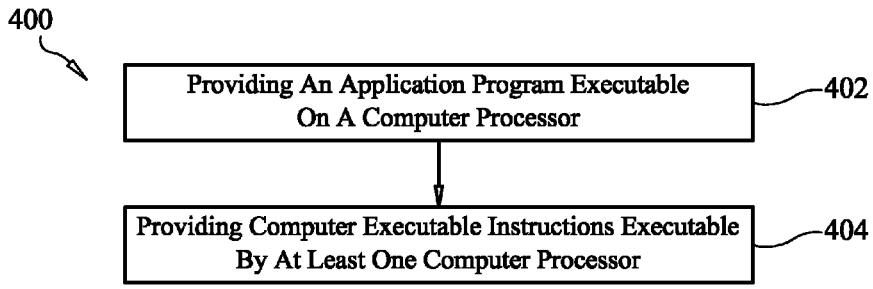
FIG. 4 is a sample flowchart of a block diagram of an exemplary method of processing an electronic data card in accordance with one embodiment.

FIG. 4 is a sample flowchart of a block diagram of an exemplary method of processing an electronic data card in accordance with one embodiment. In some embodiments, method 400 may comprise of providing an application program 132 executable on a computer processor 112 (step 402) and providing computer executable instructions 134, 134' executable by at least one computer processor 112' (step 404) configured to perform any one or more of the following: control the card reader 110 to activate the electronic data card 102 for validating the biometric sample 108 received contemporaneous to the card's 102 activation; control the card reader 110 to receive the at least one card holder's information 116 stored thereon upon validation of the biometric sample 108 and/or control the card reader 110 to transmit the at least one card holder's information to the computer processor 112 for verification of the at least one card holder's travel authorization 118. In some embodiments, the electronic data card 102 is configured for being accessed by the application program 132 executable on a computer processor 112.

Figure 5:
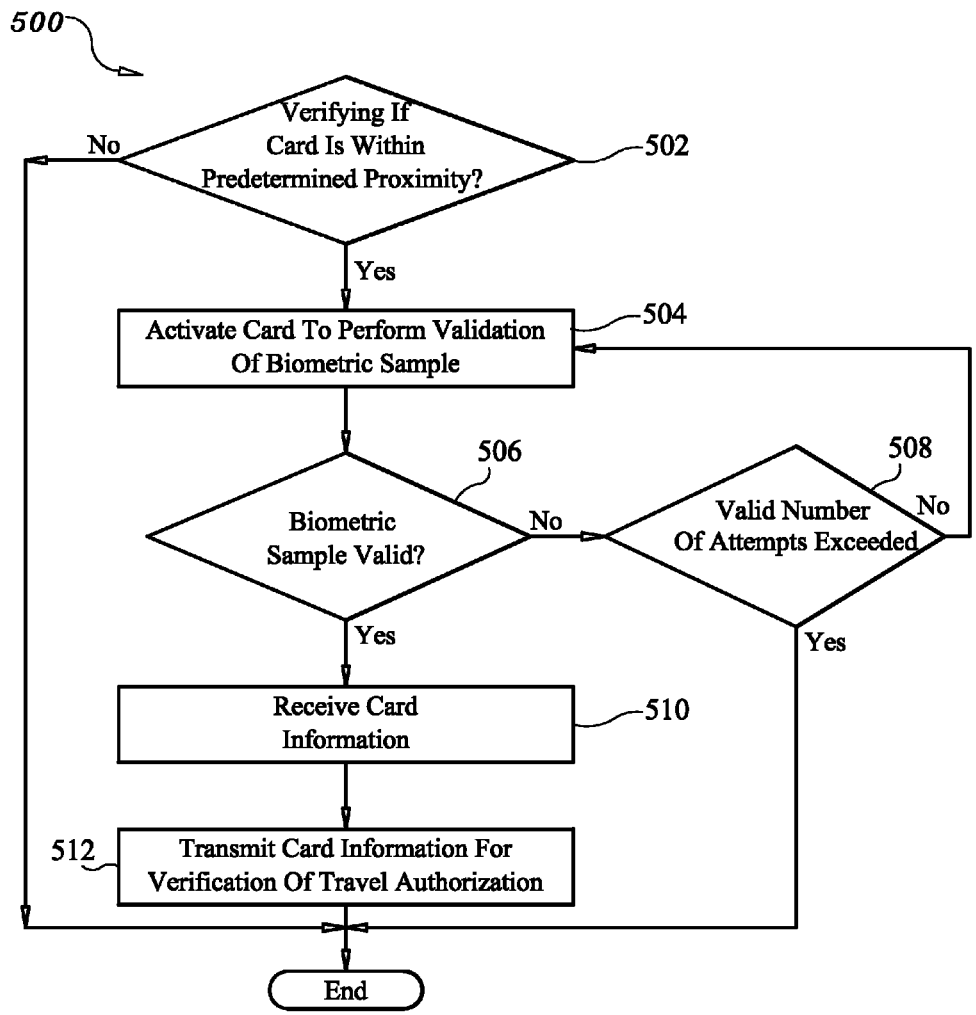
FIG. 5 is a sample flowchart of an exemplary method of determining the electronic card holder's authorization in accordance with one embodiment.

FIG. 5 is a sample flowchart of an exemplary method of determining the electronic card holder's authorization in accordance with one embodiment. Method 500 comprises of the card reader 110 verifying whether the electronic data card 102 is within the predetermined proximity 114 (step 502) to be able to be read. If the card 102 is outside of the predetermined proximity 114, the card reader 110 does not activate or continue reading the card 102 creating no receipt and/or transmission of the information stored thereon. As such, method 500 self aborts.

However, if the electronic data card 102 is within the predetermined proximity 114, card reader 110 activates the electronic data card 102 to perform validation of a biometric sample 108 (step 504) received contemporaneous to the card reader 110 activating the card 102. Because the authentication process requires an in-person submission of a recent biometric sample 108 contemporaneous with the electronic data card 102 being read by the card reader 110, even if the electronic data card 102 is stolen it is rendered useless to an authorized user as the unauthorized user's biometric sample 108 will fail to match the biometric identifier 104 stored thereon. Biometric sample 108 will be validated against the at least one or more biometric identifier 104, 104' stored thereon and may be validated by the biometric verification means 106 positioned on the electronic data card 102 and/or the card reader 110. In either embodiment, if the biometric sample 108 is valid (step 506), method 500 may proceed to step 510. Otherwise, method 500 allows card holder to provide another valid biometric sample 108 for validation so long as the valid number of attempts have not been exceeded (step 508), in which case method 500 returns to step 504. If the valid number of attempts has been exceeded (step 508) method 500 self aborts providing personnel with the opportunity to follow through with its protocol for determining whether the electronic data card 102 is at issue or the card holder's identity may be fraudulent and/or the card holder's travel authorization 118 may be unauthorized or revoked.

If the biometric sample 108 was valid, card reader 110 received card holder's information (step 510 and transmits cardholder's information to the computer processor 112 for verification of the card holder's travel authorization (step 512).

The card reader 110 requires the electronic data card 102 to be within the predetermined proximity in order for the card to be read, which prevents external card readers 302, 302' from skimming the identification information 116 stored thereon, keeping the information secure.

Once the card holder's identification information 116 is released, method 500 further comprises receiving the card holder's identification information 116 stored on the electronic data card 102 upon validation of the biometric sample 108 (step 504). In some embodiments, the card reader 110 transmits the card holder's identification information and the computer via an application program 132 accesses law enforcement records, e.g. a state's department of motor vehicle records and/or immigration records, for determining the card holder's authorization to enter a country's borders. Method 500 may further comprise of accessing law enforcement records for determining the card holder's travel authorization 118 to enter a country's borders.

Hardware and Operating Environment

This section provides an overview of exemplary hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the methods 400, 500 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 6:
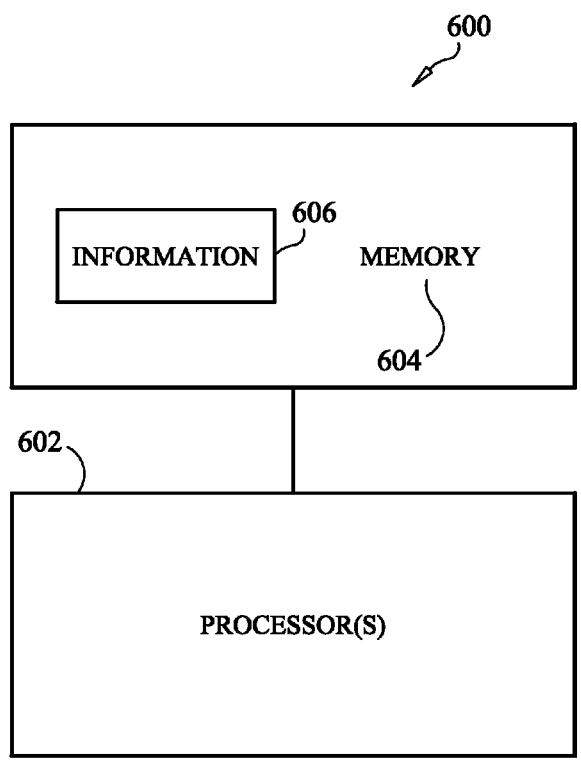
FIG. 6 is a block diagram representing an apparatus according to the various embodiments.

FIG. 6 is a block diagram representing an article according to various embodiments. Such embodiments may comprise a computer, a memory system, a magnetic or optical disk, some other storage device, or any type of electronic device or system. The article 600 may include one or more processor(s) 602 coupled to a machine-accessible medium such as a memory 604 (e.g., a memory including electrical, optical, or electromagnetic elements). The medium may contain associated information 606 (e.g., computer program instructions, data, or both) which, when accessed, results in a machine (e.g., the processor(s) 602) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. A system comprising of:
   (a) an electronic data card configured for electronically storing thereon at least one biometric identifier used to identify a card holder;
   (b) biometric verification means, positioned on the electronic data card, configured for receiving at least one biometric sample from the card holder for validation with the at least one biometric identifier stored thereon; and
   (c) a card reader in electronic communication with a computer processor and the electronic data card, wherein the card reader is configured for activating the electronic data card when the electronic data card is within a predetermined spatial proximity to the card reader, for validating the at least one biometric sample received contemporaneous to the activation of the electronic data card, where only upon validation of the at least one biometric sample, the electronic data card releases the at least one card holder's information to the card reader, which receives the at least one card holder's information and transmits it to the computer processor for determining the at least one card holder's travel authorization.

2. The system of claim 1 further comprising:
   (a) an application program executable on the computer; and
   (b) computer executable instructions executable by the at least one computer processor and configured to perform any one or more of the following:
      (i) control the card reader to activate the electronic data card;
      (ii) control the card reader to receive the at least one card holder's information upon validation of the biometric sample; and
      (iii) control the card reader to transmit the at least one card holder's information to the computer processor for verification of the at least one card holder's travel authorization.

3. The system of claim 1, wherein the electronic data card is selected from the group of electronic devices comprising essentially of smart cards, memory cards and processor cards.

4. The system of claim 1, wherein the electronic data card includes memory means.

5. The system of claim 4, wherein the memory means may include any one or more of the following stored thereon: at least one biometric sample, at least one biometric identifier, identification information, travel authorization, background report, visa restrictions, or other data structures.

6. The system of claim 5, wherein data structures includes but are not limited to: card number, security parameters, visa restrictions, and identification information.

7. The system of claim 5, wherein identification information includes but is not limited to: name, address, date of birth, sex, issue date, and height.

8. The system of claim 1, wherein the biometric verification means includes but is not limited to: fingerprint recognition means, hand geometry recognition means, palm geometry recognition means, iris recognition means, retina recognition means, speech recognition means.

9. The system of claim 1, wherein the electronic data card is configured for communicating with the computer or the card reader in any of the following manner: wirelessly or wired.

10. The system of claim 1, wherein the electronic data card is configured for being accessed by the application program executable on the computer.

11. The system of claim 1, wherein the predetermined proximity is programmable for a range comprising of 1 to 1.5 inches from the card reader.

12. A method comprising:
   (a) providing an electronic data card configured for electronically storing thereon at least one biometric identifier used to identify a card holder;
   (b) providing biometric verification means, positioned on the electronic data card, configured for receiving at least one biometric sample from the card holder for validation with the at least one biometric identifier stored thereon; and
   (c) providing a card reader in electronic communication with a computer processor and the electronic data card, wherein the card reader is configured for activating the electronic data card when the electronic data card is within a spatial predetermined proximity to the card reader, for validating the at least one biometric sample received contemporaneous to the activation of the electronic data card, where only upon validation of the at least one biometric sample, the electronic data card releases the at least one card holder's information to the card reader, which receives the at least one card holder's information and transmits it to the computer processor for determining the at least one card holder's travel authorization.

13. The method of claim 12, further comprising:
  (a) providing an application program executable on a computer; and
  (b) providing computer executable instructions executable by at least one computer processor configured to perform any one or more of the following:
    (i) control the card reader to activate the electronic data card;
    (ii) control the card reader to validate the biometric sample with the at least one biometric identifier stored thereon;
    (iii) control the card reader to receive the at least one card holder's identification information stored thereon upon validation of the biometric sample; or
    (iv) control the card reader to transmit the at least one card holder's identification information to the computer processor for verification of the at least one card holder's travel authorization.

14. The method of claim 12, wherein the electronic data card is selected from the group of electronic devices comprising essentially of smart cards.

15. The method of claim 12, wherein the electronic data card includes memory means.

16. The method of claim 15, wherein the memory means may include any one or more of the following stored thereon: at least one biometric sample, at least one biometric identifier, background report, visa restrictions, identification information or data structures.

17. The method of claim 12, wherein data structures includes but is not limited to: card number, security parameters, visa restrictions, card validation information, activity log and global positioning system location information.

18. The method of claim 12, wherein identification information includes but is not limited to: state of issue, restrictions, card number, name, address, date of birth, sex, issue date, height, expiration date, or endorsement.

19. The method of claim 12, wherein the biometric verification means includes but is not limited to: fingerprint recognition means, hand geometry recognition means, palm geometry recognition means, iris recognition means, retina recognition means, speech recognition means.

20. The method of claim 12, wherein the electronic data card is configured for communicating with the computer or the card reader in any of the following manner: wirelessly or wired.

21. The method of claim 12, wherein the electronic data card is configured for being accessed by the application program executable on the computer.

22. A method comprising:
  (a) activating an electronic data card when the electronic data card is within a spatial predetermined proximity to a card reader, where upon activation the electronic data card validates at least one biometric sample, recently received from card holder via biometric verification means positioned on the electronic data card, with at least one biometric identifier stored on the electronic data card and releases card holder's information to the card reader; and
  (b) receiving the card holder's information stored on the electronic data card only upon validation of the biometric sample.

23. The method of claim 22, further comprising accessing law enforcement records for determining the card holder's authorization to enter a country's borders.

* * * * *